United States Patent
MacLellan et al.

[19]

[11] Patent Number: 5,940,006
[45] Date of Patent: Aug. 17, 1999

[54] ENHANCED UPLINK MODULATED BACKSCATTER SYSTEM

[75] Inventors: John Austin MacLellan, Aberdeen; R. Anthony Shober, Red Bank; Giovanni Vannucci, Middletown Township, all of N.J.

[73] Assignee: Lucent Technologies Inc., Murray Hill, N.J.

[21] Appl. No.: 08/571,004

[22] Filed: Dec. 12, 1995

[51] Int. Cl.[6] ........................................... H04J 3/00
[52] U.S. Cl. .................. 340/825.54; 340/825.49; 340/505; 340/568; 340/572; 235/375; 235/435; 455/88
[58] Field of Search ................... 340/825.54, 825.49, 340/825.35, 505, 568, 572, 573; 235/375, 435, 380; 342/44, 51; 455/88

[56] References Cited

U.S. PATENT DOCUMENTS

| | | | |
|---|---|---|---|
| 4,360,810 | 11/1982 | Landt | 343/6.5 R |
| 4,752,776 | 6/1988 | Katzenstein | 340/825.54 |
| 5,390,360 | 2/1995 | Scop et al. | 455/34.2 |
| 5,425,032 | 6/1995 | Shloss et al. | 370/95.2 |
| 5,471,212 | 11/1995 | Sharpe et al. | 342/51 |
| 5,485,520 | 1/1996 | Chaum et al. | 380/24 |
| 5,627,517 | 5/1997 | Theimer et al. | 340/572 |

*Primary Examiner*—William A. Cuchlinski, Jr.
*Assistant Examiner*—Y. Beaulieu

[57] ABSTRACT

A Time Division Multiple Access (TDMA) duplex radio communication system uses an Interrogator to generate a first radio signal by modulating a first information signal onto a radio carrier signal which is sent to at least one remote Tag of the system. The remote Tag receives and modulates a second information signal onto a second radio carrier signal to form a second modulated signal which is transmitted, in a time-slotted manner, back to the Interrogator. The remote Tag selects, or is instructed, how many times it should repetitively transmit the second modulated signal; and selects, or is instructed, over how many of the time slots following receipt of the first radio signal the remote Tag should repetitively transmit the second modulated signal. Other embodiments use Modulated Backscatter to transmit the second modulated signal, and use homodyne detection to demodulate the second modulated signal. A Frequency Division Multiple Access (FDMA) duplex radio communication system embodiment utilizes multiple subcarrier frequencies and another embodiment combines the FDMA and the TDMA methods. A Code Division Multiple Access (CDMA) embodiment utilizes multiple spreading codes and another embodiment combines the CDMA and the TDMA methods.

58 Claims, 5 Drawing Sheets

FIG. 1

FIG. 2
DOWNLINK SIGNAL

ENHANCED UPLINK MODULATED BACKSCATTER SYSTEM

RELATED APPLICATIONS

Related subject matter is disclosed in the following applications: U.S. patent application Ser. No. 08/504,188, entitled "Modulated Backscatter Wireless Communication System Having an Extended Range," inventors James G. Evans, R. Anthony Shober, Giovanni Vannucci, and Steven A. Wilkus; U.S. patent application Ser. No. 08/492,174, entitled "Full Duplex Modulated Backscatter System," inventors John A. MacLellan, R. Anthony Shober, Giovanni Vannucci, and Gregory A. Wright; and U.S. patent application Ser. No. 08/492,173, entitled "Dual Mode Modulated Backscatter System," inventors R. Anthony Shober, Giovanni Vannucci, and Gregory A. Wright.

FIELD OF THE INVENTION

This invention relates to wireless communication systems and, more particularly, to a wireless communication system using modulated backscatter technology.

BACKGROUND OF THE INVENTION

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. The objectives of RFID systems are to design a reliable, secure, novel architecture and to minimize the total cost of the Interrogator and the Tags, while meeting the system performance requirements. In RFID systems, the Interrogator communicates to the Tags using modulated radio signals, and the Tags respond with modulated radio signals. Most commonly, this communication utilizes Time-Division Duplex (TDD) or Half Duplex techniques. Full Duplex (FD) techniques are also possible, as disclosed in pending U.S. patent application Ser. No. 08/492,174, and are particularly useful where a fast response is needed. In a TDD system, after transmitting a message to the Tag, the Interrogator then transmits a Continuous-Wave (CW) radio signal to the Tag. The Tag then modulates the CW signal using Modulated BackScattering (MBS) where the antenna is electrically switched, by the modulating signal, from an "open" to a "short".

Examples of prior art in MBS technology are described in U.S. Pat. Nos. 4,075,632 and 4,360,810. MBS systems typically utilize the amplitude-modulated techniques described above for communications from the Interrogator to the Tag, and utilize MBS for communications from the Tag to the Interrogator. The MBS communications can utilize any conventional modulation technique. MBS systems are desired to operate successfully in the presence of multiple Tags in the Interrogator reading field. There are classically known techniques (e.g., Simple Aloha, Slotted Aloha) which allow multiple devices to respond to a central communications device when each of those devices is not aware of the presence of the others. This invention discloses improved methods for MBS systems to successfully operate with multiple Tags responding in an independent and simultaneous manner.

SUMMARY OF THE INVENTION

In accordance with the present invention, a novel Time Division Multiple Access (TDMA) duplex radio communication system comprises an Interrogator which generates a first radio signal by modulating a first information signal onto a radio carrier signal. The Interrogator transmits the first radio signal to at least one remote Tag of the system. The remote Tag receives and processes the received first radio signal. The remote Tag then modulates a second information signal onto a second radio carrier signal to form a second modulated signal. This second modulated signal is then transmitted, in a time-slotted manner, back to the Interrogator. The remote Tag selects, or is instructed, how many times it should repetitively transmit the second modulated signal and selects, or is instructed, over how many of the time slots following receipt of the first radio signal the remote Tag should repetitively transmit the second modulated signal. Other embodiments of this invention include the use of Modulated Backscatter to transmit the second modulated signal, and the use of homodyne detection to demodulate the second modulated signal. A novel Frequency Division Multiple Access (FDMA) duplex radio communication system is also developed which utilizes multiple subcarrier frequencies; in addition a novel approach which combines the FDMA and the TDMA methods is also disclosed. A novel Code Division Multiple Access (CDMA) duplex radio communication system is also developed which utilizes multiple spreading codes; in addition a novel approach which combines the CDMA and the TDMA methods is also disclosed. A novel method for power control of the tag, using modulated backscatter, is also disclosed. Finally, a method for the Interrogator to instruct the Tag to dynamically alter the data rate of the second information signal is also disclosed.

DETAILED DESCRIPTION

RFID system applications differ greatly in the data rate requirements for the Downlink (Interrogator to Tag) and the Uplink (Tag to Interrogator) directions; they also differ greatly in other parameters, such as the number of Tags that may be located in the reading field. For example, one class of applications involves using RFID technology to read information from a Tag affixed to a container or pallet. In this application, the container is moved (by being pulled by a small truck) across the reading field of an Interrogator. The reading field is defined as that volume of space within which a successful transaction can take place. Since the Tag is moving through the reading field, the RFID system has only a limited amount of time to successfully complete the transaction In this application, the Tag could be moving as fast as 10 meters/second through the reading field. The reading field would consist of a roughly conical volume, extending 5 meters away from the Interrogator, and the cone having an angle of roughly 60 degrees total spread (30 degrees to either side of a direct path from the Interrogator to a point immediately in front of the Interrogator). Given this situation, the RFID communications with each Tag must be completed in less than about 0.2 seconds. Also, in this application, generally only a few (1–2) Tags are in the reading field at the same time.

Another application example is to use RFID flags to track sacks of mail in a post office. In this example, the sacks of mail would be placed inside a large bin or container, and the bin moved through the reading field at a relatively low speed (perhaps 1–2 meters/second at most). However, this application may have up to 50 or more Tags in the reading field simultaneously.

In other applications, RFID Tags may be attached to every item on the shelves of supermarkets, and these RFID Tags interrogated as the shopping cart is passed under (or through) an Interrogator reading field. In this application, far beyond 50 Tags may need to be in the reading field.

Other applications for RFID systems call for the Tags to be interrogated at distances significantly greater than 5 meters. To support this greater range, the Downlink and Uplink data rates are limited to maintain an acceptable signal-to-noise ratio at both the Tag and at the Interrogator. An example of these alternative applications was discussed in pending U.S. patent application Ser. No. 08/504,188, entitled "Modulated Backscatter Wireless Communication System Having An Extended Range," in which Tags were used as Electronic Shelf Labels to display correct prices on a supermarket shelf.

Therefore, an object of the present invention is an RFID system that provides flexibility to allow a common RFID system design to support these differing applications. To accomplish this, the RFID system of the present invention utilizes Modulated Backscatter technology that operates with an Enhanced Uplink.

In this invention, we disclose how to enhance the uplink protocol and performance of an MBS system using any of three different multiple access schemes—Time Division Multiple Access (TDMA), Frequency Division Multiple Access (FDMA), and Code Division Multiple Access (CDMA). The information received by the Tag from the Downlink will be used to inform the Tag which variant of these multiple access schemes to use.

Figure 1:
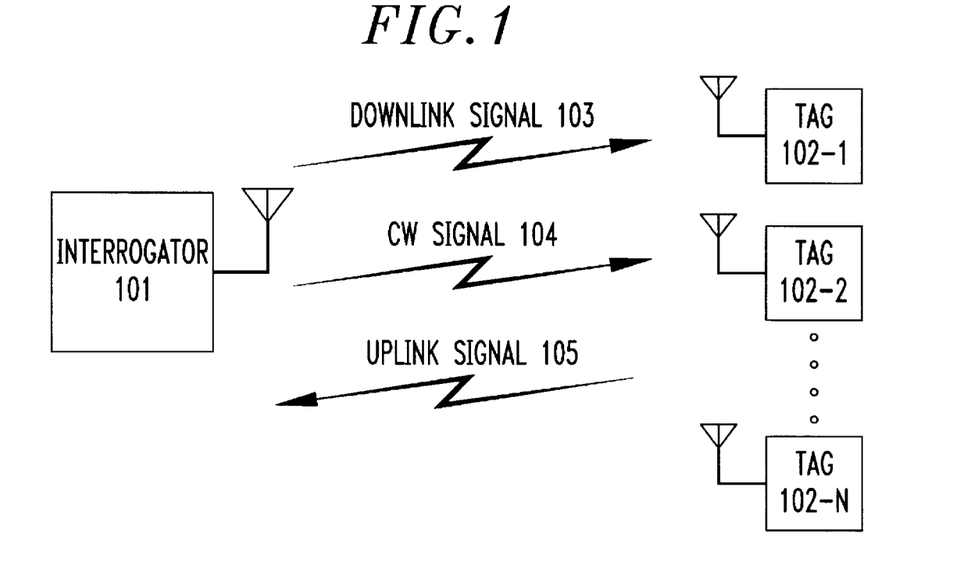
FIG. 1 shows a block diagram of an illustrative Radio Frequency Identification (RFID) system.

With reference to FIG. 1, there is shown an overall block diagram of an illustrative RFID system useful for describing the application of the present invention. An RFID Interrogator 101 communicates with a plurality of Tags (Tag 1, referred to as 102-1, through Tag N, referred to as 102-N, all collectively referred to as 102) using radio communications. The Downlink Signal 103 is typically an amplitude modulated signal and it instructs the Tag 102 in the specifics of the Uplink Signal 105 that it should return to the Interrogator 101. The Uplink Signal 105 is transmitted to the Interrogator 101 by the use of MBS. The details of the Uplink Signal 105 will be discussed below. In summary, the Interrogator 101, after having transmitted the Downlink Signal 103, then transmits a CW Signal 104 to the Tag 102. Through the use of MBS, the Tag 102 can modulate and reflect this CW Signal 104 back to the Interrogator 101.

Figure 2:
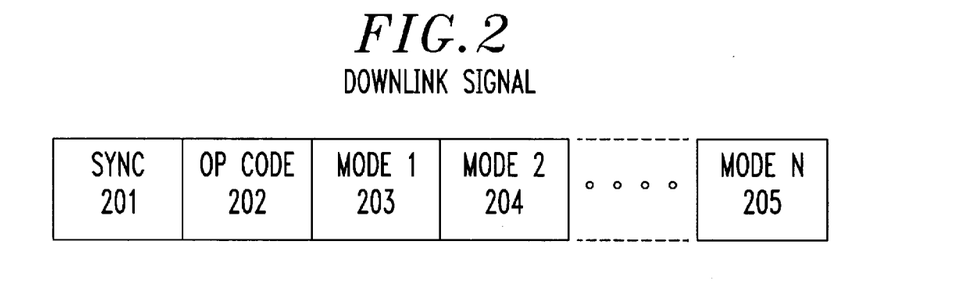
FIG. 2 shows one possible embodiment of the various fields contained within a Downlink Signal; used in the RFID system of FIG. 1.

FIG. 2 illustrates how the Downlink Signal 103 could be formatted. One primary purpose of the Downlink Signal 103 is to allow the Tag 102 to achieve synchronization with the Interrogator 101. The Downlink Signal could contain a Synchronization Field 201, an optional Op Code 202, an optional Mode 1 indicator 203, an optional Mode 2 indicator 204, and other optional Mode indicators (e.g., 205). This formatting is illustrative of the general method. The Op Code 202 is treated here as a separate field. However, the Op Code 202 is more general; the Op Code 202 does not have to be in a separate field from the other portions of the Downlink Signal 103. For example, the Op Code 202 could be an integral part of the Synchronization Field 201, in the sense that the bits used for synchronization and the bits used for the Op Code could be intermixed in any manner; however the result of the Tag 102 receiving this intermixed series of bits is that bit synchronization is achieved, which is the objective of the Synchronization Field 201, and also that the Tag 102 can infer the Op Code 202 from this intermixed series of bits. Additionally, an explicit Op Code 202 could be optional in the sense that a particular implementation of the techniques disclosed below could be encoded, in some manner, within the Tags 102. In this case, the Tags 102 are programmed to respond in a fixed manner whenever they receive a Synchronization Field 201. In this case, even though no explicit Op Code 202 is transmitted, an Op Code—that is, the instruction to execute a specific operation—could be implied by the design of the system.

The Synchronization Field 201 allows Tags in the reading field to achieve bit synchronization to the Downlink Signal 103. This field is typically a set of repeating bit patterns. The best method is to send a PN or Barker code. The Op Code 202, whether it is explicit or implicit, is the fundamental control parameter for the Tag. In a pending application Ser. No. (08/492,173) a technique similar to this is used for the purpose of informing the Tag which of two different Modes of operation to use for the Uplink Signal from this Tag. In this invention, an explicit Op Code 202 informs the Tag 102 which of a wide range of Uplink Signal 105 Modes should be used. Mode 1 (203) and Mode 2 (204) messages are sent to instruct the Tag what parameters to use for specific Uplink Signal 105 Modes.

Time Division Multiple Access (TDMA)

Figure 3:
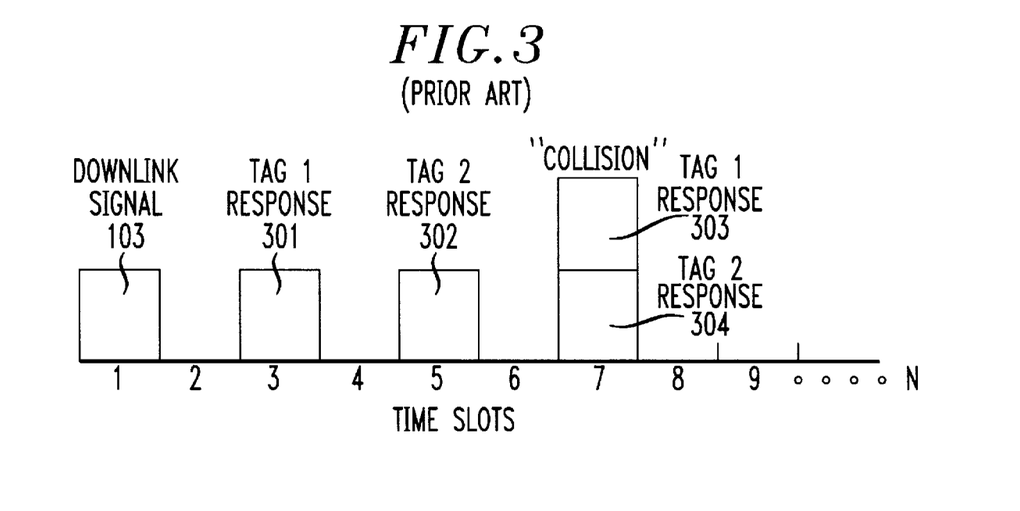
FIG. 3 shows a Time Slot sequence used in conventional implementations of the RFID system of FIG. 1.

The most straightforward multiple access scheme to use is TDMA. In TDMA, the Downlink Signal 103 informs all Tags in the reading field that they should respond (e.g., with their IDentification number). After completion of the Downlink Signal 103, the Tags 102 are able to respond with an Uplink Signal 105. In the classical technique known as Simple Aloha, the Tags 102 respond at randomly chosen times after the completion of the Downlink Signal 103. In the classical technique Slotted Aloha, the RFID system divides time after the completion of the Downlink Signal 103 into discrete Time Slots, as illustrated in FIG. 3. In this Figure, after the completion of the Downlink Signal 103, time is divided into a finite number of Time Slots, typically of fixed length. The Uplink Signal 105 from the first Tag to respond—let us refer to that response as Tag 1 Response (301)—is received in Time Slot 3, where Time Slot 1 is the Time Slot in which the Downlink Signal 103 is received.

The Uplink Signal 105 from the second Tag to respond—referred to as Tag 2 Response (302)—is received in Time Slot 5. In Time Slot 7, however, we find that Tag 3 Response (303) and Tag 4 Response (304) are both received—this is called a "collision". The result of the collision, ignoring capture effects, is that neither Tag 3 Response (303) nor Tag 4 Response (304) is correctly received by the Interrogator 101.

Figure 4:
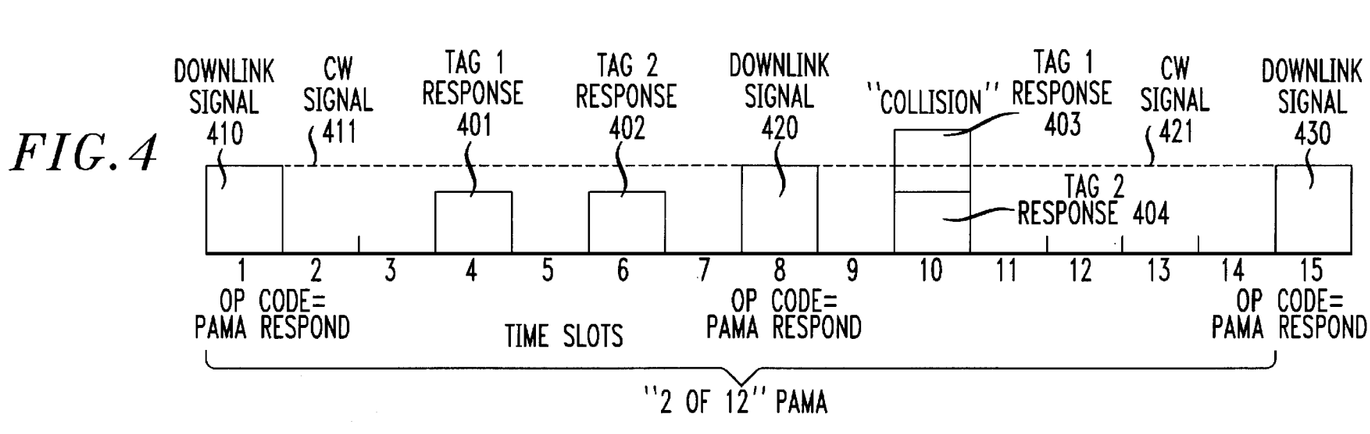
FIG. 4 shows the Poly Aloha Multiple Access (PAMA) method used in the RFID system of FIG. 1.

To mitigate this problem, a Poly Aloha Multiple Access (PAMA) method has been developed in accordance with the present invention. An example of PAMA is shown in FIG. 4. In this illustration, a "2 out of 12" PAMA is shown. By "2 out of 12" we mean the following: Downlink Signal 410 is transmitted to all Tags in the reading field. This message instructs all such Tags to respond with their Uplink Signals 105 using a "2 out of 12" PAMA—i.e., the Op Code 202, explicit or implicit, indicates that PAMA should be used, the Mode 1 (203) parameter is "2", and the Mode 2 (204) parameter is "12". Note that after the Downlink Signal 410 shown in FIG. 4 is sent, the Interrogator 101 then transmits CW Signal 411 so that the Tags 102 can modulate and selectively reflect the CW Signal 411 back to the Interrogator 101. Thus, the Tag Responses (e.g., 401) represent modulated reflections of the CW Signal 411; this technique is called Modulated Backscatter. For the remainder of this specification, it should be understood that the CW Signal 411 may be utilized as the radio carrier signal for the Tag. Alternatively, if desirable, the Tag could contain a separate radio carrier signal generator.

In PAMA, time is divided into time slots, which are shown here for simplicity as being of equal length. The Interrogator 101 transmits Downlink Signals 103 within the duration of one time slot; in this example, a Downlink Signal 103 is transmitted regularly every 8 time slots. This regular transmission is done because new Tags can enter the reading field at any time, and since those Tags may be moving rapidly (as discussed above), frequent Downlink synchronization messages are required to be sure a Tag is not "missed". (Note that in an FD system, a synchronization signal may be available all the time.) The Mode 2 parameter (12 in this case) indicates that, after the Tag 102 receives the Downlink Signal (such as 410), it will transmit (using MBS) Mode 1 (i.e., 2) Uplink Signal 105 responses within the next Mode 2 (i.e., 12) available time slots. Note that Time Slot 8 in FIG. 4 is occupied by Downlink Signal 420, so the Tags 102 would not consider that time slot to be available. The Tags would randomly select which two of the available 12 Time Slots to use for their Uplink Signals 105.

In the above, it was stated that "the Op Code 202 indicates that PAMA should be used." As discussed above, the Op Code 202 is an optional parameter which could be either explicitly included or inferred based upon the system design. Thus, it would be possible for a Downlink Signal 103 to contain a Synchronization Field 201, a Mode 1 (203) parameter, and a Mode 2 (204) parameter, but no explicit Op Code 202; in this case, the Op Code 202 would be inferred by the system design as meaning "all Tags 102 that receive this Downlink Signal 103) should respond with an Uplink Signal 105 using the (Mode 1) out of (Mode 2) PAMA scheme." Thus, the Op Code 202 could be implicit. However, in the case where a more complex protocol is desired, such as one in which you wish to instruct the Tag 102 to perform other functions than to transmit the standard PAMA responses, an explicit Op Code 202 is required.

Therefore, PAMA, generalized to allow variable "Mode 1" and "Mode 2" parameters determined by the Downlink Signal 103, constitutes a general method to allow different types of RFID applications to use a common protocol. PAMA could be further generalized to allow the Downlink Signal 103 to instruct the Tags 102 to modify what data is sent in the Uplink Signal 105, the length of time occupied by each Time Slot, etc. This could be accomplished by adding more "Mode N" parameters to the Downlink Signal 103 in a straightforward extension of the Downlink Signal 103 illustrated in FIG. 2.

The "Mode 1" and "Mode 2" parameters may be used in the following manner. RFID applications which have more Tags 102 in the reading field, and in which the Tags 102 are moving less rapidly, could use a larger "Mode 2" parameter i.e., space the Uplink Signals 105 farther out in time, thus allowing more Uplink Signals 105 to be successfully received. RFID applications which have fewer Tags 102 in the reading field, and in which the Tags 102 are moving more rapidly, could use a smaller "Mode 2" parameter—i.e., have the Uplink Signals 105 received within a relatively short time period, thus allowing the Tags 102 to move more rapidly. The Mode 1 parameter could be determined based upon the expected number and speed of Tags in the reading field, and based upon the selected value of "Mode 2", in order to achieve a particular probability of successful uplink transmission.

Another example of the PAMA method is now described. The Interrogator 101 could take measurements of the signal strength and error characteristics of Uplink Signals 105 received during specific Time Slots. If the signal strength is strong within a certain Time Slot, but the error rate was high within that Time Slot, it might be reasonably inferred that multiple Tags 102 had each transmitted an Uplink Signal 105 within that Time Slot. If this event occurs often over a series of Time Slots, it might be reasonably inferred that more Tags 102 are in the reading field than the current values of "Mode 1" and "Mode 2" can support. In that event, the Interrogator 101 could change the "Mode 1" and "Mode 2" parameters in the Downlink Signal 103; perhaps instructing the Tags in the reading field to space their Uplink Signals 105 over a longer series of Time Slots (i.e., increase "Mode 2"). It may also be found by simulation or experimentation that changes in "Mode 1" could be of assistance in this regard. Using this technique, the PAMA technique can be dynamically adapted, based on the characteristics of the number of Tags 102 in the reading field.

Figure 5:
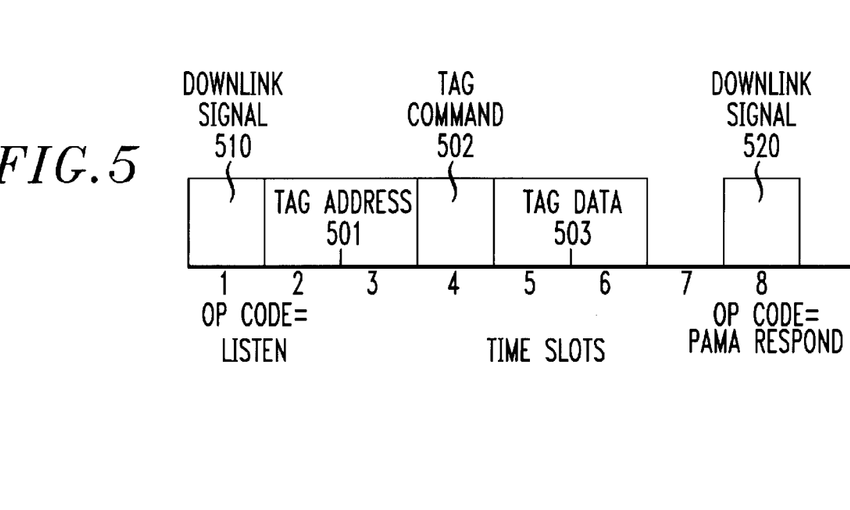
FIG. 5 expands the PAMA method shown in FIG. 4 in which a specific Tag is sent a command and/or data.

The PAMA technique described above can be further generalized to allow the Interrogator (101) to send a command and/or data to a particular Tag 102; this can happen in the following manner. The Op Code 202 can direct the Tags 102 to respond with their identification number using the PAMA technique as discussed above. The Op Code 202 could alternately direct the Tags 102 to not immediately respond. This is shown in FIG. 5. The Interrogator 101 sends Downlink Signal 510 to all Tags 102 in the reading field. The Op Code 202 in Downlink Signal 510 commands all Tags 102 to listen and to not transmit any Tag Responses (e.g., 401) until the next Downlink Signal 520 is received. The Interrogator 101 then transmits a Tag Address 501) indicating the identification number of a specific Tag 102 with which it wishes to communicate. After the Tag Address 501, a Tag Command 502 is sent to that Tag 102, indicating what operation the Interrogator 101 is directing that Tag 102 to perform. Then, optional Tag Data 503 is sent by Interrogator 101 to the Tag 102; this optional field contains data the Interrogator wishes this Tag 102, for example, to store in its local memory. FIG. 5 shows the Tag Address 501 requiring two Time Slots to transmit, and the Tag Command 502 requiring one Time Slot to transmit, and the Tag Data 503)

requiring two Time Slots to transmit; these choices were made for illustrative purposes only; in an actual implementation the length of time required to transmit each of these three transmissions (501, 502, or 503) could be less than or more than the number of Time Slots shown in FIG. 5. The actual number of Time Slots, or whether some or all of these transmissions (501, 502, or 503) could be sent together within a single Time Slot, would depend on the length of one Time Slot, the Downlink data rate, the number of bits in each of these transmissions (501, 502, and 503), etc. It is also possible, referring again to FIG. 5, for some or all of the Downlink Signal 510, the Tag Address 501, the Tag Command 502, and the Tag Data 503, to be transmitted within a single Time Slot; as mentioned before, this is determined by the length of the Time Slot, the number of bits in each field to be transmitted, and the Downlink bit rate, etc.

Therefore, a particular Tag 102 could be sent a specific message containing an operation and specific data destined for that Tag 102. It should be obvious at this point that the protocol could be extended to allow more than one Tag 102 to receive a specific message containing a different operation and data, assuming the Downlink data transmission rate was sufficiently large and the number of bits of information in transmissions (501, 502, and 503) were sufficiently small such that communications to more than one Tag 102 could take place within the time period of Time Slots 2–7 of FIG. 5.

At Time Slot 8 of FIG. 5, the Interrogator sends Downlink Signal 520, which could request all Tags 102 in the reading field to respond with their identification numbers. Alternately, the Interrogator 101 could send Downlink Signal 520 to request all Tags 102 in the reading field to listen for another Tag Address 501, Tag Command 502, etc.; this would be done in the event that the Interrogator 101 desires to transmit a command and/or data to another Tag 102.

Let us assume that the Interrogator 101 has transmitted a Tag Address 501) Tag Command 502, etc., and let us further assume that the operation indicated by the Tag Command 502 instructs the addressed Tag 102-1 to perform some function (e.g., store data transmitted within the Tag Data 503 field), which does not require the Tag 102-1 to transmit any data back to the Interrogator 101. However, even if no data is to be transmitted back to the Interrogator, the Tag 102-1 should transmit an acknowledgment indicating successful receipt of the previous command (i.e., that the command was legitimate, that the entire message was received error free, that the command was successfully executed, etc.). Thus, after successful receipt of the previous message, the Interrogator 101 would transmit another Downlink Signal 103 instructing all Tags 102, including Tag 102-1, to respond with their Uplink Signals 105 using the PAMA technique described above. Tag 102-1 would include within its Uplink Signal 105 a Tag Ack 604 (described further below) indicating successful receipt of the previous message. If Tag 102-1 does not receive the previous message correctly (i.e., in an error free manner), or if it is otherwise unable to execute the Tag Command 502, the Tag 102-1 would transmit an Uplink Signal 105 with a Tag Ack 604 indicating this Tag 102 did not take any action based upon the previous message. All other Tags 102 would also transmit an Uplink Signal 105, using the PAMA technique, with a Tag Ack 604 indicating that this Tag 102 did not take any action based upon the previous message. Thus, given this technique, the Tag 102-1 has acknowledged the previous message, and the normal PAMA scheme has begun.

The PAMA technique described above can be further generalized to allow the Tag 102 to respond with data other than the data with which it normally responds during a Tag Response (e.g., 401). Using the above techniques, a Tag 102 could be transmitted a specific Tag Address 501, Tag Command 502, and optional Tag Data 503. We note that the above technique could be used to send a specific Tag Command 502 to one, more than one, or all of the Tags 102 in the radio field. The Tag Address 501 field could identify a single Tag (i.e., 102-1), or could identify a set of Tags 102 in the reading field (e.g., all Tags 102 which represent cargo containers of a common type), or the Tag Address 501 could identify all Tags 102 in the reading field. For simplicity, we will assume that only one Tag (Tag 102-1) was identified by the Tag Address 501. This Tag 102-1 is thus instructed to carry out the operation indicated by the Tag Command 502.

Figure 6A:
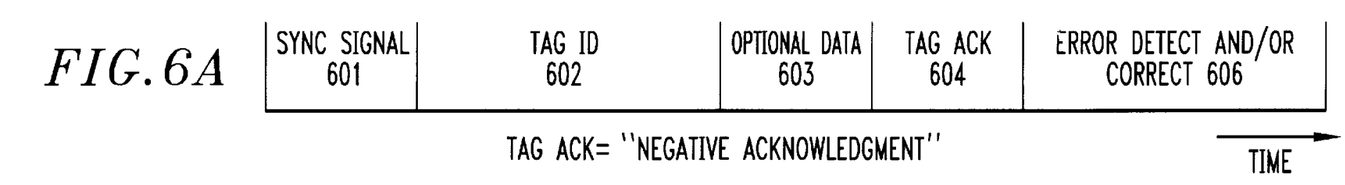
FIGS. 6A–6C further expand the PAMA method shown in FIG. 4 to illustrate the various forms of a Tag Response.
Figure 6B:
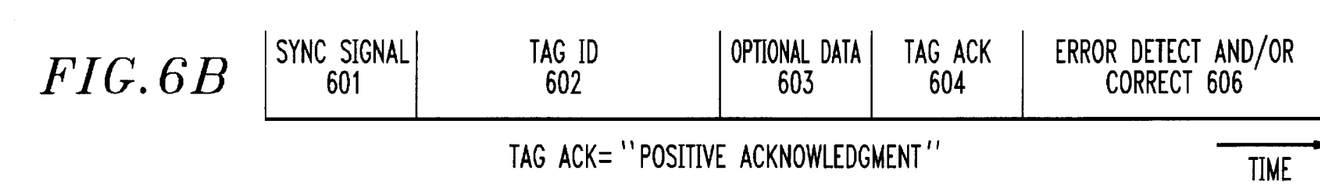

To illustrate a specific embodiment of the above techniques, FIG. 6A and FIG. 6B show how the Tag Responses (such as 401, 402, etc.) could be formatted. FIG. 6A shows the Uplink Signal 105 that the Tags 102 would use for a "normal" PAMA response. This format would be used in the event this Tag 102 was not previously addressed by a Tag Address 501 field. This format would also be used in the event this Tag 102 was previously addressed by a Tag Address 501 field, but for any reason (as discussed above) this Tag 102 was unable to successfully complete the Tag Command 502. The Uplink Signal 105 response would begin with a Sync Signal 601 (to allow the Interrogator 101 to properly achieve bit synchronization to this Uplink Signal), then contain a Tag ID 602 9a unique number indicating the identification of this Tag), then contain Optional Data 603 (which would contain any data stored on the Tag 102 that is always transmitted to the Interrogator 101 together with the Tag ID 602), then contain a Tag Ack 604 (containing "Negative Acknowledgment"), and then contain an Error Detect and/or Correct 606 (to allow the Interrogator 101 to validate the accuracy of and/or correct the received Uplink Signal).

If a Tag 102-1 has previously received, immediately before the last Downlink Signal 520, a Tag Address 501, Tag Command 502, and optionally Tag Data 503, and the Tag Command 502 was successfully executed, then that Tag 102-1 would respond as shown in FIG. 6B. This response is essentially identical to the response shown in FIG. 6A discussed above, except that the contents of the Tag Ack 605 would be a "Positive Acknowledgment". The use of "Positive Acknowledgment" in the Tag Ack 604 field would indicate successful execution of the Tag Command 502. It should be noted that "Positive Acknowledgment" is a general response which could be encoded in any manner (e.g., "Positive Acknowledgment" as a "1" and "Negative Acknowledgment" as a "0"). Thus, the Tag Responses shown in FIG. 6A and in FIG. 6B could be of identical length and format, and could be transmitted to the Interrogator 101 using the PAMA technique discussed above (i.e., these Tag Responses are sent "Mode 1" times over the next "Mode 2" available Time Slots), where the "Mode 1" and "Mode 2" parameters are transmitted by the Interrogator 101 during Downlink Signal 520.

It should be noted that FIG. 5 shows the Interrogator 101 sending Downlink Signal 520 during Time Slot 8. Since the Tag Data 503 was completed during Time Slot 6, the Interrogator could have chosen to begin Downlink Signal 520 during Time Slot 7 rather than 8. Thus, if the Tag Address 501, Tag Command 502 and Tag Data 503 fields do not require many Time Slots, the next Downlink Message 520 can proceed as soon as possible to allow as many transactions to proceed in as short an overall time period as possible.

One application of the above protocol is if a Tag 102 is identified as being in the reading field, and the Interrogator then wishes to instruct that particular Tag 102 that it does not wish it to further respond. This could occur in the event that a Tag 102 remains in the reading field indefinitely, and responding continuously; unless the responses are halted, the battery in the Tag 102 could run down. Therefore, it would be helpful for the Interrogator to recognize that a particular Tag has successfully acknowledged, and is continuing to acknowledge, and request that Tag to cease further responses (perhaps for a specific time duration). This could be accomplished by the Interrogator transmitting this Tag's Address 501 and a Tag Command 502, as shown in FIG. 5, where the Tag Command 502 instructs this particular Tag (Tag 102-1) to cease further responses. Another use for this same technique would be for the Interrogator 101, once it received an Uplink Signal 105 from a specific Tag 102-1 and therefore identified this Tag 102-1 as being in the reading field, could instruct this particular Tag 102-1 to cease further responses. This would allow the remainder of the Tags 102 in the reading field to continue responding according to the PAMA technique discussed above, but with a larger probability of having the Interrogator 101 receive their Uplink Signals 105 without a collision. Therefore, using this technique, PAMA could support even more Tags in the reading field.

Figure 6C:
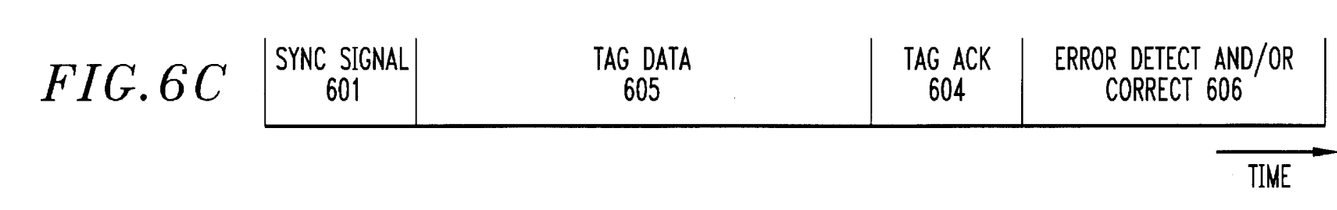
Figure 7:
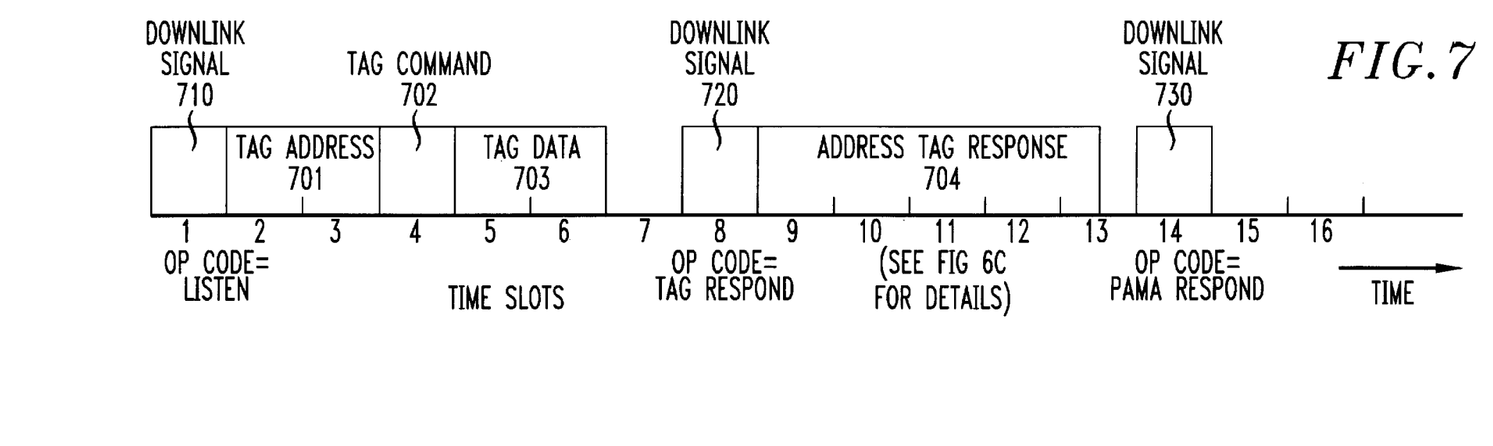
FIG. 7 further expands the PAMA method shown in FIG. 4 to illustrate how the Tag Response shown in FIGS. 6A–6C fits into the overall PAMA structure shown in FIG. 4.

As discussed above and as shown in FIGS. 6A, 6B, the Interrogator 101 could request that the Tag 102 transmit data to the Interrogator other than the Tag ID 602 and the Optional Data 603 that the Tag 102 normally transmits during a Tag Response Signal. Such an exchange could occur in the following manner, shown in FIG. 7. In FIG. 7, the Interrogator 101 transmits a Downlink Signal 710 to the Tags 102 in the reading field with the Op Code 202 in the Downlink Signal 710 set to "Listen" (i.e., requesting Tags 102 not to respond as per the PAMA technique, but rather to Listen for a Tag Address 701, immediately following the Downlink Signal 710, to determine if this Tag 102 is being specifically addressed). The Interrogator 101 then transmits the Tag Address 701, Tag Command 702, and (optionally) Tag Data 703 to a specific Tag 102-1. The Tag Command 702 instructs this Tag 102-1 to transmit a portion of, or all of, its data (which could be data stored in the memory of the Tag 102-1, or data collected from sensors or other communications devices connected to the Tag 102-1, etc.). The Interrogator then transmits Downlink Signal 720 instructing the specified Tag 102-1 to respond with the data requested by the Tag Command 702, to not use PAMA for this Address Tag Response, but to begin transmitting this Tag Response immediately after completion of Downlink Signal 720. The Op Code 202 in this Downlink Signal 720 also instructs all Tags in the reading field other than Tag 102-1 to not respond until another Downlink Signal 730 is received. The Address Tag Response 704 could have the format shown in FIG. 6C. The Address Tag Response 704 can be as long or as short as needed (based upon the amount of data required, the data rate, etc.). After the Address Tag Response 704) has been completed (shown in FIG. 7 as lasting until mid-way through Time Slot 13—obviously this could take either less time or more time depending on above-mentioned factors), the Interrogator 101 recognizes (by successful receipt of the Sync Signal 601, Tag Data 605, and Error Detect And/Or Correct 606) that the Address Tag Response 704 has been completed, and the Interrogator can then begin transmitting the next Downlink Signal 730, shown in FIG. 7 as during Time Slot 14 (note that there was no need to wait until Time Slot 16, as all Tags 102 other than Tag 102-1 are waiting for the next Downlink Signal 730. This Downlink Signal 730 could instruct all Tags 102 in the reading field to respond with their Tag Response Signal (FIG. 6A); i.e., the Op Code 202 of the Downlink Signal 730 would be "PAMA Respond".

Given the above, it should be apparent that all required building blocks for full two-way communication exist. Initially, the Interrogator 101 wishes to determine which Tags 102 are in the reading field. Therefore, the Interrogator 101 transmits Downlink Signal 410 requesting any Tags 102 in the reading field to respond using the PAMA multiple access scheme. The Tags 102 will then respond as shown in FIG. 4. The Interrogator then knows the Tag ID's of the Tags 102 in the reading field. Assume that the Interrogator 101 desires to transmit data to a particular one of those Tags, Tag 102-1, and also wants to receive data from Tag 102-1. Then, the Interrogator 101 transmits Downlink Signal 510 with the Tag Address 501 being the same address as that received as the Tag ID 602 Tag 102-1. This allows Tag 102-1 to be informed that a command and data is being sent to it (in the form of Tag Command 502 and Tag Data 503), and commands all Tags 102 to listen and see if their Tag ID matches the Tag Address 501. Then, the Interrogator sends Downlink Signal 520 which requests Tag 102-1 to transmit a Tag Response Signal as shown in FIG. 6C. After the Interrogator has received the Tag Response Signal shown in FIG. 6C, the Interrogator can then send Downlink Signal 730 to begin the process again.

A variant of the above will allow more Tags 102 in the reading field. The Interrogator 101 transmits Downlink Signal 410 to request that Tags 102 in the reading field respond as per FIG. 6A. The Interrogator then learns the Tag ID 602 of all, or some, of the Tags 102 in the reading field. The Interrogator 101 then transmits Downlink Signal 510, with Op Code 202 being "Listen", and then transmits Tag Address 501 and a Tag Command 502, which informs a particular Tag (102-1) that it should cease any responses until a Downlink Signal 510 is transmitted with an Op Code 202 of "Clear, PAMA Respond", which requests all Tags 102 in the reading field to respond even if they had been previously directed to be silent. In this manner, Tag 102-1 is caused to be silent, thus increasing the probability that all Tags 102 can be received. This procedure can be continued, with more and more Tags 102 being directed to cease any responses, until all Tags 102 in the reading field are identified.

Finally, it may be helpful for the Interrogator 101 to know the PAMA pattern selected by a particular Tag 102. For example, for a "2 out of 12" PAMA, the PAMA pattern is the sequence "4, 10", in the sense that the two responses are transmitted in allowable time slot numbers 4 and 10 (see Tag 1 Responses (401, 403) in FIG. 4). This information could be valuable to the Interrogator 101 in supporting a larger number of Tags 102 in the reading field by avoiding collisions. Assume that the Interrogator 101 has identified a particular Tag, 102-1, as being in the reading field, but the Interrogator 101 wants to know the PAMA pattern of this Tag 102-1. The Interrogator 101 transmits Downlink Signal 510 with Op Code 202 of "Listen". This command instructs all Tags 102 to listen for following messages. The Interrogator 101 then transmits a Tag Address 501 (whose address is the address of Tag 102-1), a Tag Command 502 (where the command instructs this particular tag to respond with data including its PAMA pattern), and optionally transmits Tag Data 503 (in the event the Interrogator 101 also wishes to send data to Tag 102-1). This Tag Command 502 instructs Tag 102-1 to transmit a Tag Response Signal 520, containing its PAMA sequence within the Tag Data 605 field, as shown in FIG. 6C. After the Interrogator has received this Tag Response Signal (e.g., 401), the Interrogator can then send Downlink Signal 730 to begin the process again.

Frequency Division Multiple Access (FDMA)

Figure 8:
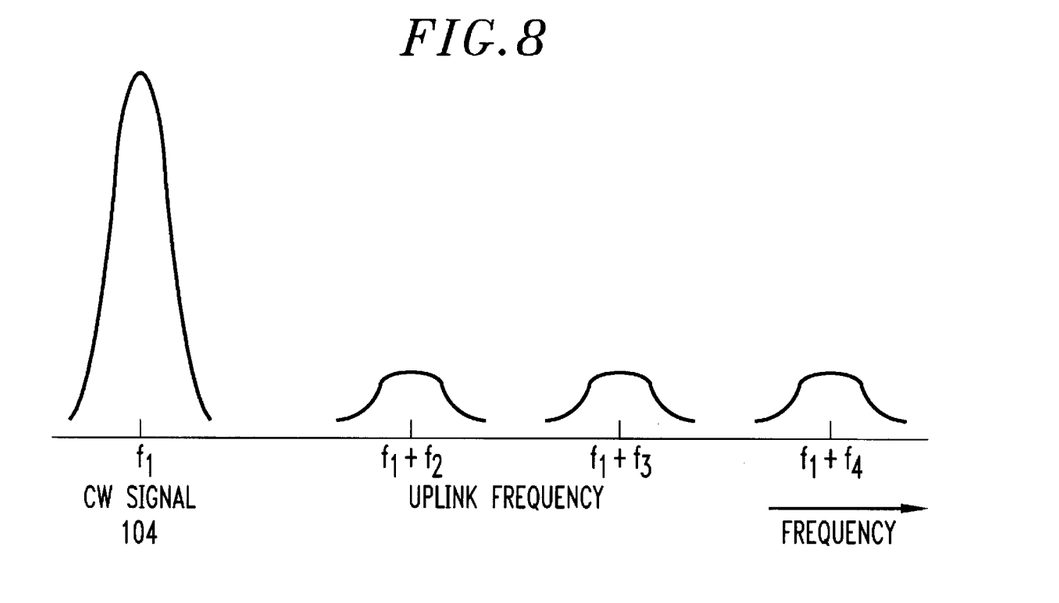
FIG. 8 shows the relationship of multiple Uplink Frequencies used in the Uplink Signal shown in FIG. 1.
Figure 9:
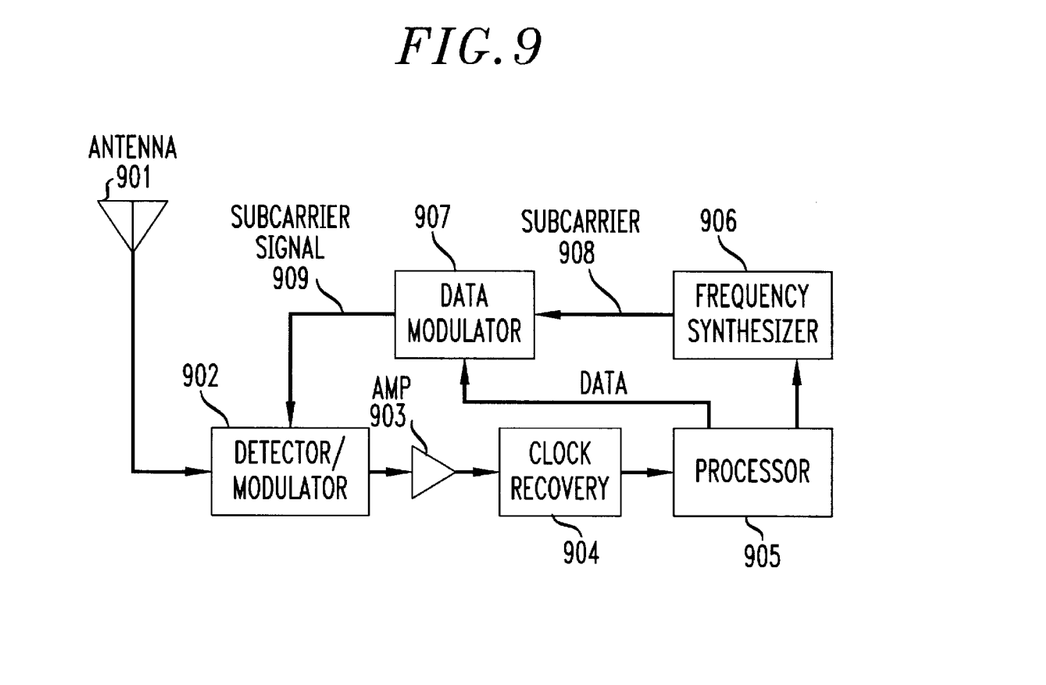
FIG. 9 shows one embodiment of the remote Tag shown in FIG. 1.

In the TDMA approach outlined above, time is divided into a set of Time Slots and Tag Responses (such as 301) are transmitted in various of the Time Slots. Another approach to this problem is for the Tags 102 to respond to the Downlink Signal 103 using different frequencies. Using MBS, this could be accomplished as illustrated in FIG. 8. The Interrogator 101, after having transmitted the Downlink Signal 103, would then transmit the CW Signal 104 to the Tags 102 in the reading field. Referring to FIG. 8, denote the CW Signal 104 as being at RF frequency $f_1$. The uplink frequency in FIG. 8 is shown at either frequency $(f_1+f_2)$, $(f_1+f_3)$, or $(f_1+f_4)$. The frequencies $f_2$, $f_3$, or $f_4$ are referred to as Subcarrier Frequencies, as they represent offsets from the RF CW Signal 104 at frequency $f_1$. FIG. 9 shows an illustration of a block diagram for a Tag 102 with the capability to synthesize multiple uplink frequencies. The following illustrates how the subcarrier frequencies $f_2$, $f_3$, or $f_4$ could be created. The Frequency Synthesizer 906 illustrates a general method to synthesize one or more Subcarrier 908 frequencies. Given a single frequency source, and program controllable divider circuits or a PLL-based frequency synthesizer, the Frequency Synthesizer 906 could, under control of the Processor 905, synthesize more than one Subcarrier 908 frequency; thus this technique could synthesize the Subcarrier Frequencies $f_2$, $f_3$, and $f_4$.

The Tag 102 could determine, perhaps randomly, which Subcarrier 908 frequency to use. Alternately, the Downlink Signal 103 could contain information—perhaps using additional "Mode" parameters (205, etc.)—to direct the Tag 102 as to which Uplink subcarrier frequency to use. Once the Tag 102 has determined the Subcarrier Frequency to use, the Detector/Modulator 902 can send (for example) the Tag 1 Response (401) back to the Interrogator. Any of several conventional modulation schemes could be used to accomplish this transmission. For example, the Subcarrier 908 frequency, once selected, could be used as a "carrier", and the data contained in the Tag 1 Response (301) could be modulated onto the Subcarrier Frequency by the Data Modulator 907. This modulation would commonly use Phase-Shift Keying (PSK), but could use other modulation schemes as well. Therefore, the Tag 102 could transmit its Uplink Signal 105 using one of (potentially) any number of different Subcarrier Frequencies (the three Subcarrier Frequencies discussed above being only one embodiment), using PSK modulation of the actual data.

To allow multiple Tags 102 in the reading field at one time, the Tags 102 could, for example, randomly select one of the available Subcarrier Frequencies and transmit their Uplink Signals 105. Alternately, Tags 102 could use a combination of the FDMA technique discussed here with the TDMA PAMA technique discussed above. For example, Tags 102 could be directed to respond with their Uplink Signals 105 in (Mode 1) Time Slots out of the next (Mode 2) available Time Slots, with the Time Slots to use being chosen randomly, and with the Subcarrier Frequency to use also being chosen randomly. In that manner, additional degrees of freedom are provided which would allow more Tags 102 to be in the reading field at the same time and still be reliably identified. Another alternative would be for the Tags 102 to be identified using the TDMA PAMA technique outlined above; then, particular Tags 102 could be directed to respond with an Address Tag Response 704 using different Uplink Subcarriers, thus allowing more than one Tag 102 to respond with an Address Tag Response 704 at the same time.

A specific example of the above is as follows. The Interrogator 101 transmits a Downlink Signal 410 to all Tags 102 in the reading field. The Tags 102 respond using PAMA as discussed above. All of the Tags 102 respond using the same Subcarrier 908 frequency; this could be built permanently into the Tag 102 firmware, or, for example, the Tags 102 could be instructed by the Interrogator 101 to all respond on the same Subcarrier 908 frequency by the Op Code 202 received within the Downlink Signal 410. Then the Interrogator 101, based upon the information contained within the Tag Responses (401, 402, etc.), could decide that it wishes to request data from a particular Tag (102-1) in the reading field. The Interrogator 101 then transmits another Downlink Signal 710 (whose Op Code 202 instructs all Tags 102 to "Listen") followed by a Tag Address 701 and a Tag Command 702, instructing that specific Tag 102-1 to transmit a particular set of data back to the Interrogator 101. Then, the Interrogator 101 transmits another Downlink Signal 720. The Op Code 202 of this Downlink Signal 720 instructs the specific Tag 102-1, whose ID matched that transmitted in the Tag Address 701, to respond with an Address Tag Response 704 (see FIG. 6C for details); and it also instructs all other Tags 102 in the reading field to respond using "normal" PAMA with their Tag N Response (401, etc.) messages. However, the Address Tag Response 704 would be transmitted by Tag 102-1 using a different subcarrier frequency that that used for "normal" PAMA Tag N Responses (401, etc.). The fact that Tag 102-1 uses a specific Subcarrier 908 frequency could be permanently built into the Tag, or it could be instructed to do so by the Interrogator through information contained in the Tag Command 702 or in the Tag Data 703. Thus, in this manner, the Interrogator could continue, in a relatively unhindered manner, to receive both Uplink Signals 105 (Tag N Responses (401, etc.) from Tags 102 other than Tag 102-1 using one Subcarrier 908 frequency, and to receive data (an Address Tag Response 704) from Tag 102-1 on another Subcarrier 908 frequency.

In the above cases, the selection of Subcarrier 908 frequencies should be made with care. In pending application Ser. No. 08/504,188, it is disclosed that MBS systems have modulated reflections from a wide variety of mechanical and electronic equipment. Thus, in general, the Subcarrier 908 frequency must be large enough to avoid such noise—at least above 10 kHz, preferably above 100 kHz, and ideally as great as 500 kHz or more. Furthermore, in the case that multiple Tags are responding simultaneously on different Subcarrier 908 frequencies, the different frequencies must be adequately separated such that the data bandwidths can be transmitted without interfering with each other.

For the Interrogator to demodulate responses received on different Subcarrier 908 frequencies complicates, somewhat, the Interrogator design but is not difficult in practice. A/D converters and Digital Signal Processing (DSP) techniques could be used to sample the demodulated signal in the interrogator 101; the A/D converters would have sampling rates high enough to support the highest Subcarrier 908 frequency that Tag 102 could support. The DSP could then perform a Fourier analysis to recover data from the multiple Subcarrier Frequencies.

Code Division Multiple Access (CDMA)

CDMA is a multiple access protocol that involves using Direct Sequence Spread Spectrum (DSSS) modulation, applied to both the Downlink and to the Uplink. Each "mobile" (or Tag 102 in this case) is assigned a unique spreading code; this allows the mobile and the base to differentiate the communications from one mobile or the other by decorrelating the incoming signal using the unique spreading code. CDMA is usually considered to be a complex multiple access protocol because of the decorrelation operations that must be performed, as well as complex timing and power management issues.

We should first differentiate between the use of Direct Sequence Spread Spectrum (DSSS) as a Modulation scheme and the use of CDMA as a multiple access scheme. There may be benefits to RFID applications to use DSSS even if CDMA is not used. For example, it may be desirable for either the Downlink Signal 103 or the Uplink Signal 105 to be spread (i.e., to use DSSS Modulation). The noise/interference environment may be "bursty" in the sense that the noise is of short time duration relative to the length of a Downlink Signal 103 or an Uplink Signal 105. Or the multipath environment may be such that there are deep nulls, with temporal widths small in comparison to the length of a Downlink Signal 103 or an Uplink Signal 105. In either case, DSSS Modulation, assuming there is adequate processing gain, may be helpful in defeating this type of noise and/or multipath. If the noise is broadband, or has Gaussian characteristics, then it is unlikely for DSSS Modulation to be helpful.

Thus, we now consider how CDMA could be applied to an RFID system. In the Downlink, let us consider an RFID system implementation in which all Interrogators within range of each other are transmitting the same information in a time synchronized manner or, equivalently, that the Interrogators are sufficiently spatially separated such that their signals are independent. Then, the use of CDMA in the Downlink is essentially the same as using DSSS modulation in the Downlink; we have already discussed under what conditions this could be of benefit. One disadvantage of this approach is that the Tag 102 would have to perform a decorrelation function to retrieve the Downlink Signal 103 data from the spread Downlink message; thus, the Processor 905 in the Tag 102 would have to operate at (the length of the spreading code) times faster than the actual data rate of the Downlink Signal 103. The faster the Processor 905 operates, the more power that processor consumes, thus reducing the lifetime of the Tag 102 (which typically has a small non-replaceable battery).

To use CDMA for the Uplink, different DSSS spreading codes are assigned to different tags; thus, the advantage of CDMA for the Uplink is that multiple Tags 102 could send their Uplink Signals 105 at the same time. The implementation of this may not be complex. For example, assume that the Processor 905 in the Tag 102 operates from a fixed frequency clock of 4 MHz. The Processor 905 can then create, using software, a subcarrier of perhaps as much as 1 MHz, where the maximum frequency subcarrier is dependent on Processor architecture and instruction set. Alternately, a subcarrier frequency could be synthesized in hardware using a crystal oscillator and frequency divider circuits; this method could allow a higher subcarrier frequency to be synthesized than would be possible using software in the Processor 905. Using the techniques discussed above, the subcarrier could be used as a carrier upon which the spreading code could be modulated, to form a spread subcarrier, and the data for the Uplink Signals 105 could be modulated upon this spread subcarrier. The Interrogator would then perform the decorrelation for the spreading codes being used at this time. If CDMA is used for all Uplink Signals 105, then the Interrogator a priori will not know which Tags are in the reading field, and will therefore have to perform a decorrelation on all possible spreading codes (which could be a complex task, depending on the number of spreading codes used). The length of the spreading code used, and thus the amount of "coding gain" achieved, is based upon the ratio of the maximum encoded subcarrier the Tag 102 can generate (1 MHz in the above example) and the data rate of the Uplink Signal 105. For example, if the data rate of the Uplink Signal 105 was 10 kbps, then the spreading code could be of length roughly 100, leading to a processing gain of roughly 19 dB.

To implement CDMA for the Uplink Signals 105, the Tags 102 would be assigned spreading codes, or they could choose the codes randomly at the time they receive the Downlink Signal 103. The Tags 102 would then respond with their Tag Response 401 as was shown above for PAMA; however the Tag Response 401 for a particular tag would use a specific spreading code. Since the actual data rate for the Tag Response 401 could be unchanged, the responses which took one Time Slot above to complete would still require the same one Time Slot to complete in the CDMA Uplink case. However, multiple Tags would be acknowledging during one time slot.

In order to keep the complexity of the decorrelation in the Interrogator 101 to a manageable level, it may be necessary to limit the total number of uplink spreading codes in use within the entire population of Tags 102. In this case, the Tag 102 could, for example, choose the spreading code randomly either at Tag initialization time or at the time a Downlink Signal 103 is received. However, that would mean that it is possible for more than one Tag to be responding at the same time using the same direct sequence spreading code, and thus the Interrogator could not successfully decorrelate those signals. In that event, it may be beneficial to combine the use of CDMA for the Uplink Signals together with the TDMA PAMA scheme discussed above. Conceptually, this is the same as discussed above by combining FDMA with the TDMA PAMA. The PAMA scheme could function as described above; however, the Tag Responses 401 would be spread using a randomly chosen spreading code. This would allow more Tags to be in the reading field at one time and still be identified; or it could allow the same number of Tags 102 to be in the reading field, but to identify those tags in fewer Time Slots (since you are trading Time Slots for coding space). Other permutations are also obvious, based upon the number of Tags, amount of coding, etc.

Uplink Power Control

One important issue in radio communications systems, and especially in CDMA systems, is power control of the mobile units. The problem is basically the classical "near/far" problem, where mobile units close to the base station will be heard by the base station at a much greater power level than mobile units far from the base station. Some CDMA systems use power control systems that have the base station monitor the strength of returning signal from various mobiles, and instruct those mobiles whose signals are received strongly to reduce that mobile's transmit power down to a predetermined threshold value, where that threshold value was determined to be the minimum power required to achieve a desired signal-to-noise ratio. In modulated backscatter systems, an incoming CW Signal 104 is received by the Tag 102, and the CW signal is modulated and reflected by the Tag 102 using modulated backscatter. It would seem that modulated backscatter would have no mechanism for power control.

Figure 10:
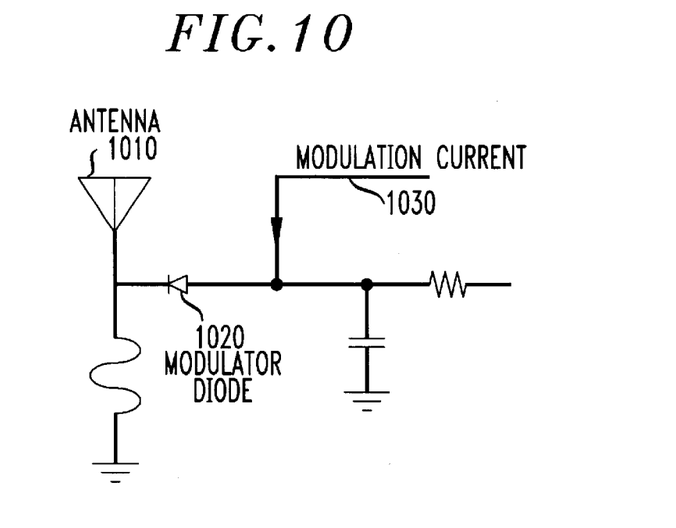
FIG. 10 shows one embodiment of the Detector/Modulator shown in FIG. 9.

One possible implementation of the Detector/Modulator 902 in FIG. 9 involves the use of a single microwave diode as a detector and also as a modulator. FIG. 10 shows one possible embodiment of a single diode as detector and also as a modulator. In this implementation, the diode has three states, based upon the amount of Modulation Current 1030: "open", "matched", and "shorted", depending on the Modulation Current 1030. (It should be noted that classes of diodes exist such as Zero Bias Schottky diodes in which no Modulator Current 1030 is necessary for the correct operation of the Diode 1020 as a detector.) The "state" that the Diode 1020 is in influences the reflection coefficient of the Antenna 1010. Assume that the required Modulation Current 1030) required to achieve the "shorted" state is $i_1$. Then, it has been found that the use of a Modulation Current 1030 less than $i_1$ will allow MBS communications to still take place but in a degraded fashion, in the sense that the "loss" the Tag 102 injects into the link budget increases as $i_1$ decreases. The reduction in $i_1$ effectively causes the reflection coefficient of the antenna to decrease, thus decreasing the amount of reflected signal. Therefore, a Tag 102 with the capability of dynamically changing the amount of Modulation Current 1030 applied to the Modulator Diode 1020 could reduce the received signal strength of the reflected signal at the Interrogator 101.

It should be obvious from the above discussion that the general technique being applied here is to electronically "de-tune" the impedance match between the Antenna 901 and the Detector/Modulator 902. This "de-tuning" will allow the signal strength of the reflected signal to be decreased by decreasing the Antenna 901 reflection coefficient. Even if the Modulator element in 902 is not a diode but, for example, an FET or a more complex circuit, the same principles apply.

It should also be obvious that the above technique could be applied to any of the TDMA, FDMA, or CDMA methods discussed above.

Variable Uplink Data Rate

In the discussion above, it has been implicitly assumed that the data rate of the Uplink Signal 105 is constant. It is possible for the Downlink Signal 103 to instruct the Tag 102 to change the data rate of the Uplink Signal 105. For example, consider an embodiment based on FIG. 9. In this embodiment, a Frequency Synthesizer 906 is used to create a Subcarrier 908. This Subcarrier 908 is used as the "carrier" upon which data is modulated by the Data Modulator 907. Note that the data rate of the data modulated by the Data Modulator 907 is not related to the specific Subcarrier 908 frequency, with the exception that the Subcarrier 908 frequency must be great enough so that enough bandwidth is present to carry the data, and that the Subcarrier 908 frequency is sufficiently far from the CW Signal 104 to minimize noise.

Figure 11:
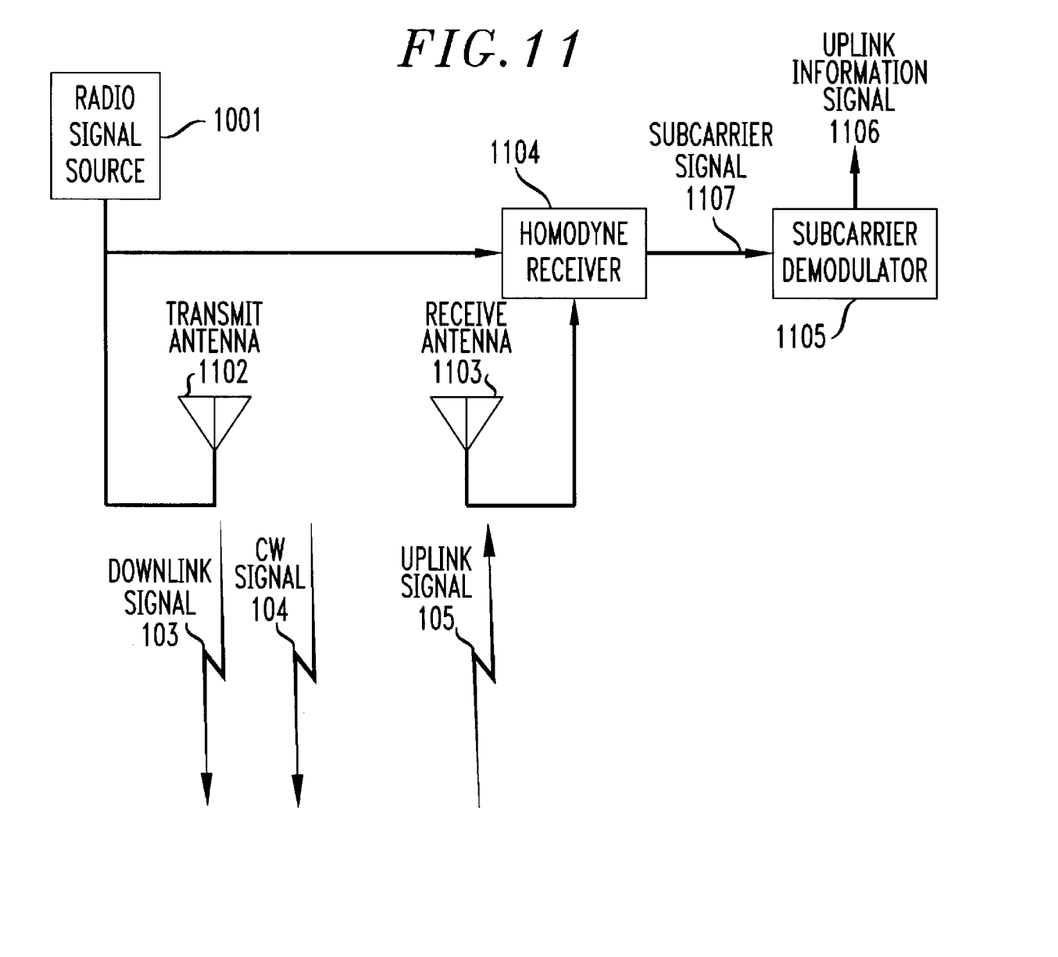
FIG. 11 shows one embodiment of the Interrogator shown in FIG. 1.

Therefore, it would be possible for the Interrogator 101 to instruct the Tag 102 to modify the Uplink Signal 105 data rate. This instruction could be done using the Op Code (202) and Mode (203, 204, etc.) parameters in FIG. 2. It should be noted that the Tag, as long as the Subcarrier 908 is large enough to support this data rate, as discussed above, the actual Subcarrier 908 frequency need not be altered. This would be of great benefit in the design of the Interrogator 101. Consider the Interrogator embodiment shown in FIG. 11. The Radio Signal Source 1101 transmits the Downlink Signal 103 and CW Signal 104) through the Transmit Antenna 1102. The Uplink Signal 105 is received by the Receive Antenna 1103, optionally amplified and filtered (not shown), and sent to a Homodyne Receiver 1104, typically an I&Q demodulator. The output of the Homodyne Receiver 1104 is the Subcarrier Signal 1107, which in theory is the same signal (except for normal radio path distortions, noise, etc.) as the Subcarrier Signal 909 of FIG. 9. This Subcarrier Signal 1107 is then sent to a Subcarrier Demodulator 1105, typically a Digital Signal Processor (DSP). Note that any filtering and amplification after the Receive Antenna 1103 is not dependent on the data rate of the Uplink Signal 105. In the Subcarrier Demodulator 1105, a change in the data rate could be easily supported. If the Subcarrier 908 frequency were unaltered, or not altered substantially, the ability to alter the data rate of the Uplink Signal 105 would not be difficult to implement. In fact, such an ability would be possible even if the Subcarrier 908 frequency were altered; however such an implementation would be more difficult than if the Subcarrier 908 frequency were not significantly altered. Also, if the Subcarrier Demodulator 1105 were a DSP, the implementation of this capability would likely be straightforward.

One possible way this capability could be utilized is as follows. The Interrogator 101 could monitor the signal quality and error characteristics of the Uplink Signals 105. In the event that the Uplink Signals 105 are being received with an unacceptable signal-to-noise ratio, but if no evidence of Collisions (see FIG. 3) are present, then a reasonable action the Interrogator could take would be to instruct the Tags in the reading field to decrease the data rate of the Uplink Signal 105. This would increase the "energy per bit" of the received Uplink Signal 105. As discussed above, using a DSP as a Subcarrier Demodulator 1105, the Interrogator 101 could also decrease the noise bandwidth within that DSP. It should also be noted that this technique of dynamically modifying the data rate of the Uplink Signal 105 could be applied to either of the three multiple access methods discussed above: TDMA, FDMA, or CDMA.

What has been described is merely illustrative of the application of the principles of the present invention. Other arrangements and methods can be implemented by those skilled in the art without departing from the spirit and scope of the present invention.

We claim:

1. A radio communication system comprising
an interrogator including
    means to generate a first radio signal, and
    means to transmit said first radio signal to at least one tag;
said at least one tag including
    means to receive said first radio signal,
    means to generate a second modulated signal by modulating a multiple bit digital second information signal onto a radio carrier signal,
    means to divide time into a series of time slots, and
    means to transmit N repetitions of said second modulated signal, where N is two or more, within a certain number of said time slots following the reception of said first radio signal; and
said interrogator further including
    means to receive said second modulated signal, and
    means to demodulate said second modulated signal to obtain said second information signal.

2. The radio communication system of claim 1 wherein said interrogator generates a CW signal following said first radio signal and said at least one tag generates said second modulated signal utilizing modulated backscatter of said CW signal.

3. The radio communication system of claim 2 wherein said interrogator demodulating means utilizes homodyne detection.

4. The radio communication system of claim 1 wherein said means to modulate said second information signal onto said radio carrier signal utilizes phase shift keying.

5. The radio communication system of claim 1 wherein said interrogator includes
   means to generate said first radio signal by modulating a first information signal onto a radio carrier signal, where said first information signal contains at least one operations code, and
said at least one tag contains
   means to demodulate said first information signal from said first radio signal, and
   means to determine said operations code from said first information signal.

6. A radio communication system comprising
an interrogator including
   means to generate a first radio signal by modulating a first information signal onto a radio carrier signal, where said first information signal contains at least one operations code,
   means to include at least one parameter, designated "Mode 1", in said first information signal, and
   means to transmit said first radio signal to at least one tag;
said at least one tag including
   means to receive said first radio signal,
   means to demodulate said first information signal from said first radio signal,
   means to determine said operations code from said first information signal,
   means to decode the contents of said "Mode 1" parameter from said first information signal,
   means to use the contents of "Mode 1" to determine how many repetitions of said second modulated signal to transmit,
   means to generate a second modulated signal by modulating a second information signal onto a radio carrier signal,
   means to divide time into a series of time slots, and
   means to transmit N repetitions of said second modulated signal, where N is two or more, within a certain number of said time slots following the reception of said first radio signal; and
said interrogator further including
   means to receive said second modulated signal, and
   means to demodulate said second modulated signal to obtain said second information signal.

7. The radio communication system of claim 6 wherein said interrogator further includes
   means to monitor communications performance of said second modulated signals, and
   means to dynamically adjust said "Mode 1" parameter based upon said communications performance of said second modulated signals.

8. The radio communications system of claim 5 wherein said interrogator includes
   means to include at least one parameter, designated "Mode 2", in said first information signal; and
said at least one tag includes
   means to decode the contents of said "Mode 2" parameter from said first information signal, and
   means to use the contents of "Mode 2" to determine how many of said time slots, following receipt of said first radio signal, said certain number of repetitions of said second modulated signal should be transmitted within.

9. The radio communication system of claim 8 wherein said interrogator further includes
   means to monitor communications performance of said second modulated signals, and
   means to dynamically adjust said "Mode 2" parameter based upon said communications performance of said second modulated signals.

10. The radio communications system of claim 5 wherein said interrogator includes
    means to include at least two additional parameters, designated "Mode 1" and "Mode 2", in said first information signal; and
said tag includes
    means to decode the contents of said "Mode 1" and said "Mode 2" parameters from said first information signal, and
    means to use the contents of "Mode 1" to determine the number of said repetitions to use, and to use the contents of "Mode 2" to determine how many of said time slots, following receipt of said first radio signal, said number of said repetitions of said second modulated signal should be transmitted within.

11. The radio communication system of claim 10 wherein said interrogator further includes
    means to monitor communications performance of said second modulated signals, and
    means to dynamically adjust said "Mode 1" and said "Mode 2" parameters based upon said communications performance of said second modulated signals.

12. The radio communication system of claim 1 wherein said interrogator has means to repetitively transmit said first radio signal.

13. The radio communication system of claim 5 wherein said interrogator includes means to repetitively transmit said first radio signal.

14. A radio communication system comprising
an interrogator including
    means to generate a first radio signal by modulating a first information signal onto a radio carrier signal, where said first information signal contains at least one operations code and
    means to transmit said first radio signal to at least one tag;
said at least one tag including
    means to receive said first radio signal,
    means to demodulate said first information signal from said first radio signal,
    means to determine said operations code from said first information signal,
    means to generate a second modulated signal by modulating a second information signal onto a radio carrier signal,
    means to include within said second information signal at least one information field for said at least one tag selected from a group of fields including a unique identification field, a Synchronization field, an additional Data field, a Tag Ack field, an Error Detect field, and a Correct field,
    means to transmit said second information signal upon receiving said operations code designated "PAMA Respond",
    means to divide time into a series of time slots, and
    means to transmit N repetitions of said second modulated signal, where N is two or more, within a certain number of said time slots following the reception of said first radio signal; and
said interrogator further including
    means to receive said second modulated signal, and
    means to demodulate said second modulated signal to obtain said second information signal.

15. A radio communication system comprising an interrogator including
- means to generate a first radio signal by modulating a first information signal onto a radio carrier signal, where said first information signal contains at least one operations code and
- means to transmit said first radio signal to at least one tag;

said at least one tag including
- means to receive said first radio signal,
- means to demodulate said first information signal from said first radio signal,
- means to determine said operations code from said first information signal,
- means to not transmit any of said second modulated signals upon receiving said operations code designated "Listen",
- means to generate a second modulated signal by modulating a second information signal onto a radio carrier signal,
- means to divide time into a series of time slots, and
- means to transmit N repetitions of said second modulated signal, where N is two or more, within a certain number of said time slots following the reception of said first radio signal;

said interrogator further including
- means to receive said second modulated signal, and
- means to demodulate said second modulated signal to obtain said second information signal.

16. The radio communications system of claim 5 wherein said interrogator includes
- means to generate a third information signal, containing at least a Tag Address, a Tag Command, and if data is necessary a Tag Data,
- means to generate a third modulated signal by modulating said third information signal onto a radio carrier signal, and
- means to transmit said third modulated signal to said at least one tag; and said tag includes
- means to receive said third modulated signal,
- means to demodulate said third information signal from said third modulated signal, and
- means to decode said third information signal.

17. The radio communications system of claim 16 wherein said at least one tag includes
- means to examine the contents of said Tag Address and said Tag Command,
- means, responsive to the results of said examination, to determine if said at least one tag is addressed, and
- means to determine if said Tag Command has been properly executed.

18. The radio communications system of claim 16 wherein said interrogator includes means to transmit said first radio signal to said at least one tag following the transmission of said third modulated signal.

19. The radio communications system of claim 18 wherein said at least one tag includes
- means to generate a fourth information signal, which includes one or more fields selected from a group including a Tag Data field, a Synchronization field, a Tag Ack field, an Error Detect field, and a Correct field,
- means to generate a fourth modulated signal by modulating said fourth information signal onto a radio carrier signal,
- means to transmit said fourth modulated signal only if said operations code contained within said first information signal is "Tag Respond" and if said at least one tag is an addressed tag, and
- means to not transmit said fourth modulated signal if said at least one tag is not an addressed tag; and said interrogator has
- means to receive said fourth modulated signal, and
- means to demodulate said fourth information signal from said fourth modulated signal.

20. A radio communication system comprising an interrogator including
- means to generate a first radio signal by modulating a first information signal onto a radio carrier signal, where said first information signal contains at least one operations code,
- means to generate a third information signal, containing at least a Tag Address, a Tag Command, and if data is necessary a Tag Data,
- means to generate a third modulated signal by modulating said third information signal onto a radio carrier signal,
- means to transmit said third modulated signal to said at least one tag and
- means to transmit said first radio signal to said at least one tag following the transmission of said third modulated signal said at least one tag including
- means to receive said third modulated signal,
- means to demodulate said third information signal from said third modulated signal,
- means to decode said third information signal
- means to receive said first radio signal,
- means to demodulate said first information signal from said first radio signal,
- means to determine said operations code from said first information signal,
- means to generate a second modulated signal by modulating a second information signal onto a radio carrier signal,
- means to divide time into a series of time slots,
- means to generate said second information signal, contained within said second modulated signal, which contains "Positive Acknowledgment" in said Tag Ack field,
- means to transmit said second modulated signal if said operations code contained within said first information signal is "PAMA Respond", and if said at least one tag is an addressed tag, and if said Tag Command has been properly executed and
- means to transmit N repetitions of said second modulated signal, where N is two or more, within a certain number of said time slots following the reception of said first radio signal;

said interrogator further including
- means to receive said second modulated signal, and
- means to demodulate said second modulated signal to obtain said second information signal.

21. A radio communication system comprising an interrogator including
- means to generate a first radio signal by modulating a first information signal onto a radio carrier signal, where said first information signal contains at least one operations code, means to generate a third information signal, containing at least a Tag Address, a Tag Command, and if data is necessary a Tag Data, means to generate a third modulated signal by modulating said third information signal onto a radio carrier signal, means to transmit said third modulated signal to said at least one tag, and means to transmit said first radio signal to said at least one tag following the transmission of said third modulated signal;

said at least one tag including means to receive said third modulated signal, means to demodulate said third information signal from said third modulated signal, means to decode said third information signal, means to receive said first radio signal, means to demodulate said first information signal from said first radio signal, means to determine said operations code from said first information signal, means to generate a second modulated signal by modulating a second information signal onto a radio carrier signal, means to divide time into a series of time slots, means to generate said second information signal, contained within said second modulated signal, which contains "Negative Acknowledgment" in said Tag Ack field, means to transmit said second modulated signal if said operations code contained within said first information signal is "PAMA Respond", and if said at least one tag is either not addressed or properly executed and means to transmit N repetitions of said second modulated signal, where N is two or more, within a certain number of said time slots following the reception of said first radio signal; and said interrogator further including means to receive said second modulated signal, and means to demodulate said second modulated signal to obtain said second information signal.

22. A radio communication system comprising an interrogator including means to generate a first radio signal by modulating a first information signal onto a radio carrier signal, where said first information signal contains at least one operations code, means to generate a third information signal, containing at least a Tag Address, a Tag Command, and if data is necessary a Tag Data, means to generate a third modulated signal by modulating said third information signal onto a radio carrier signal, means to transmit said third modulated signal to said at least one tag and means to transmit said first radio signal to said at least one tag following the transmission of said third modulated signal;

said at least one tag including means to receive said third modulated signal, means to demodulate said third information signal from said third modulated signal, means to decode said third information signal, means to examine the contents of said Tag Address and said Tag Command, means, responsive to the results of said examination, to determine if said at least one tag is addressed, means to receive said first radio signal, means to demodulate said first information signal from said first radio signal, means to determine said operations code from said first information signal, means to determine if said Tag Command has been properly executed, means to make no further transmissions upon receiving said command "Quiet" within said Tag Command, means to generate a second modulated signal by modulating a second information signal onto a radio carrier signal, means to divide time into a series of time slots, means to generate said second information signal, contained within said second modulated signal, which contains "Positive Acknowledgment" in said Tag Ack field, means to transmit said second modulated signal if said operations code contained within said first information signal is "PAMA Respond", and if said at least one tag is an addressed tag, and if said Tag Command has been properly executed, means to transmit N repetitions of said second modulated signal, where N is two or more, within a certain number of said time slots following the reception of said first radio signal, means to resume said transmissions of said second modulated signal upon reception of said first radio signal where said Operations Code contained within said first information signal contained within said first radio signal contains the command "Clear, PAMA Respond"; and said interrogator further including means to receive said second modulated signal, and means to demodulate said second modulated signal to obtain said second information signal.

23. The radio communications system of claim 19 wherein said Tag Data includes means to include the time slot numbers being used to transmit said second modulated signal by said at least one tag.

24. The radio communication system of claim 19 wherein at said at least one tag the means for modulating said second or fourth modulated signals onto said radio carrier signal utilizes modulated backscatter of a CW signal provided by said interrogator.

25. The radio communication system of claim 24 wherein said interrogator demodulating means utilizes homodyne detection.

26. The radio communication system of claim 20 wherein at said at least one tag the means for modulating said second or fourth modulated signals onto said radio carrier signal utilizes modulated backscatter of a CW signal provided by said interrogator.

27. The radio communication system of claim 26 wherein said interrogator demodulating means utilizes homodyne detection.

28. The radio communication system of claim 21 wherein at said at least one the means for modulating said second or fourth modulated signals onto said radio carrier signal utilizes modulated backscatter of a CW signal provided by said interrogator.

29. The radio communication system of claim 28 wherein said interrogator demodulating means utilizes homodyne detection.

30. The radio communications system of claim 1 wherein the series of time slots are of equal length.

31. The radio communications system of claim 1 wherein at least two of the series of time slots are not of equal length.

32. A radio communication system comprising
an interrogator including means to transmit a first radio signal to at least one tag;
said at least one tag including
means to receive said first radio signal,
means to generate and select one of a set of subcarriers,
means to generate a modulated subcarrier by modulating a second information signal onto said selected subcarrier,
means to generate a second modulated signal by modulating said modulated subcarrier onto a radio carrier signal, by using modulated backscatter, and
means to transmit said second modulated signal; and
said interrogator further including
means to demodulate said second modulated signal, to obtain said second information signal.

33. The radio communication system of claim 32 wherein said interrogator demodulating means utilizes homodyne detection.

34. The radio communication system of claim 32 wherein said interrogator further includes
means to generate said first radio signal by modulating a first information signal onto a radio carrier signal, and
means to transmit said first radio signal to at least one tag; and
said at least one tag further includes
means to receive said first radio signal,
means to demodulate said first information signal from said first radio signal, and
means to decode said first information signal.

35. The radio communication system of claim 34 wherein said at least one tag further includes means to perform said selection of said selected subcarrier based upon contents of said first information signal.

36. The radio communication system of claim 32 wherein said interrogator means to demodulate said second modulated signal includes a digital signal processor.

37. A radio communication system comprising
an interrogator including
means to generate a first radio signal,
means to transmit said first radio signal to at least one tag, and
means to divide time into a series of time slots;
said at least one tag including
means to receive said first radio signal,
means to create and select one of a set of subcarriers,
means to generate a modulated subcarrier by modulating a second information signal onto said selected subcarrier,
means to generate a second modulated signal by modulating said modulated subcarrier onto a radio carrier signal, by using modulated backscatter,
means to divide time into a series of time slots, where said time slots may or may not be of equal length, and
means to transmit N repetitions of said second modulated signal, where N is two or more, within a certain number of said time slots following the reception of said first radio signal; and
said interrogator further including
means to receive said second modulated signal, and
means to demodulate said second modulated signal to obtain said second information signal.

38. The radio communication system of claim 37 wherein said interrogator demodulating means utilizes homodyne detection.

39. The radio communication system of claim 37 wherein said interrogator includes
means to generate said first radio signal by modulating a first information signal onto a radio carrier signal; and
said at least one tag includes
means to demodulate said first information signal from said first radio signal, and
means to perform said selection of said selected subcarrier based upon contents of said first information signal.

40. The radio communication system of claim 37 wherein said interrogator demodulation means includes a digital signal processor.

41. The radio communications system of claim 37 wherein the series of time slots are of equal length.

42. The radio communications system of claim 37 wherein at least two of the series of time slots are not of equal length.

43. A radio communication system comprising
an interrogator including means to transmit a first radio signal to at least one tag;
said at least one tag including
means to receive said first radio signal,
means to create and select one of a set of spreading codes,
means to generate a spread information signal by modulating a second information signal onto said selected spreading code,
means to generate a second modulated signal by modulating said spread information signal onto a radio carrier signal portion of said first radio signal, by using modulated backscatter, and
means to transmit said second modulated signal; and
said interrogator further including
means to receive said second modulated signal, and
means to demodulate said second modulated signal to obtain said second information signal.

44. The radio communication system of claim 43 wherein said interrogator further includes
means to generate said first radio signal by modulating a first information signal onto a radio carrier signal; and
said at least one tag further includes
means to demodulate said first information signal from said first radio signal,
means to decode said first information signal, and
means to perform said selection of said selected spreading code based upon the contents of said first information signal.

45. The radio communication system of claim 43 wherein said interrogator demodulating means utilizes homodyne detection.

46. The radio communication system of claim 43 wherein said at least one tag includes means to change the reflection coefficient of the antenna.

47. The radio communication system of claim 46 wherein said means to change said reflection coefficient of said antenna includes means to vary the amount of modulation current through a diode modulator.

48. A radio communication system comprising
an interrogator including means to transmit a first radio signal to at least one tag;
said at least one tag including
means to receive said first radio signal,
means to create and select one of a set of spreading codes, means to generate a spread information signal by modulating a second information signal onto said selected spreading code, means to generate a second modulated signal by modulating said spread information signal onto a radio carrier signal, by using modulated backscatter, means to divide time into a series of time slots, and means to transmit N repetitions of said second modulated signal where N is two or more, within a certain number of said time slots following the reception of said first radio signal; and said interrogator further including means to receive said second modulated signal, and means to demodulate said second modulated signal to obtain said second information signal.

49. The radio communication system of claim 48 wherein said interrogator includes means to generate said first radio signal by modulating a first information signal onto a radio carrier signal; and said at least one tag further includes means to demodulate said first information signal from said first radio signal, means to decode said first information signal, and means to perform said selection of said selected spreading code based upon the contents of said first information signal.

50. The radio communication system of claim 48 wherein said interrogator demodulating means utilizes homodyne detection.

51. The radio communication system of claim 48 wherein said interrogator demodulation means includes a digital signal processor.

52. The radio communications system of claim 48 wherein the series of time slots are of equal length.

53. The radio communications system of claim 48 wherein at least two of the series of time slots are not of equal length.

54. A radio communication system comprising an interrogator including means to generate a first radio signal, and means to transmit said first radio signal to at least one tag;

said at least one tag including means to receive said first radio signal, means to generate a second modulated signal, by the use of modulated backscatter, by modulating a second information signal onto a radio carrier signal portion of said first radio signal, means to continuously vary the reflection coefficient of the antenna contained within said at least one tag, and means to transmit said second modulated signal; and said interrogator further including means to receive said second modulated signal.

55. The radio communication system of claim 54 wherein said means to continuously vary said reflection coefficient of said antenna includes means to vary the amount of modulation current through a diode modulator.

56. The radio communication system of claim 54 wherein said interrogator includes means to demodulate said second information signal from said second modulated signal, and said demodulating means utilizes homodyne detection.

57. The radio communication system of claim 54 wherein said interrogator includes means to generate said first radio signal by modulating a first information signal onto a radio carrier signal; and said at least one tag includes means to demodulate said first information signal from said first radio signal, means to decode the contents of said first information signal, and means to change said reflection coefficient of said antenna based upon the contents of said first information signal.

58. A radio communication tag comprising receiver means to receive an interrogator radio signal, means to generate a modulated signal by modulating a multiple bit digital second information signal onto a radio carrier signal, means to divide time into a series of time slots, and transmitter means to transmit the modulated radio signal, N times, where N is two or more, within a certain number of said time slots following the reception of said received interrogator radio signal.

\* \* \* \* \*

Disclaimer 5,940,006—John Austin MacLellan, Aberdeen; R. Anthony Shober, Red Bank; Giovanni Vannucci, Middletown Township, all of N.J. ENHANCED UPLINK MODULATED BACKSCATTER SYSTEM. Patent dated August 17, 1999. Disclaimer filed January 26, 2001, by the assignee, Lucent Technologies, Inc.

Hereby enters this disclaimer to claims 1, 3-5, 12, 13, 16 and 30 of said patent.

*(Official Gazette, May 8, 2001)*